United States Patent
Subramani et al.

(10) Patent No.: US 9,433,912 B2
(45) Date of Patent: Sep. 6, 2016

(54) PROCESS FOR SIMULTANEOUS CRACKING OF LIGHTER AND HEAVIER HYDROCARBON FEED AND SYSTEM FOR THE SAME

(75) Inventors: Saravanan Subramani, Faridabad (IN); Debasis Bhattacharyya, Faridabad (IN); Reshmi Manna, Faridabad (IN); Satyen Kumar Das, Faridabad (IN); Tridib Sarkar, Faridabad (IN); Santanam Rajagopal, Faridabad (IN)

(73) Assignee: INDIAN OIL CORPORATION LIMITED, Faridabad (IN)

( * ) Notice: Subject to any disclaimer, the term of this patent is extended or adjusted under 35 U.S.C. 154(b) by 208 days.

(21) Appl. No.: 13/638,460

(22) PCT Filed: Mar. 30, 2011

(86) PCT No.: PCT/IN2011/000223
§ 371 (c)(1),
(2), (4) Date: Oct. 1, 2012

(87) PCT Pub. No.: WO2011/121613
PCT Pub. Date: Oct. 6, 2011

(65) Prior Publication Data
US 2013/0056393 A1    Mar. 7, 2013

(30) Foreign Application Priority Data
Mar. 31, 2010   (IN) .............................. 793/DEL/2010

(51) Int. Cl.
*C10G 51/04* (2006.01)
*B01J 8/28* (2006.01)
(Continued)

(52) U.S. Cl.
CPC ................ *B01J 8/28* (2013.01); *B01J 8/0055* (2013.01); *B01J 8/1863* (2013.01); *C10G 11/182* (2013.01);
(Continued)

(58) Field of Classification Search
CPC ..... C10G 11/00; C10G 11/18; C10G 11/182; C10G 11/187; C10G 35/14; C10G 51/026; C10G 51/06; C10G 55/08; C10G 8/0055; C10G 8/1863; C10G 8/28; C10G 11/185; C10G 2300/0091; C10G 2300/104; C10G 2300/1044; C10G 2300/1059; C10G 2300/107; C10G 2300/1074; C10G 2300/1077; C10G 2300/301; C10G 2300/703; C10G 2300/708; C10G 2300/807; C10G 2300/4108; C10G 2300/4025; C10G 2400/02; C10G 2400/20; C10G 2400/28; C10G 2400/30; B01J 2208/00752; B01J 2208/00911
USPC .......................................... 208/72, 73, 74, 78
See application file for complete search history.

(56) References Cited

U.S. PATENT DOCUMENTS 2,377,935 A    6/1945   Gunness
2,386,491 A    10/1945  McOmie
(Continued)

FOREIGN PATENT DOCUMENTS

CN    101522866 A    9/2009
WO    00/18853 A1    4/2000
(Continued)

OTHER PUBLICATIONS

Wallenstein, D. et al., Influence of coke deactivation and vanadium and nickel contamination on the performance DF low ZSM-5 levels in FCC catalysts, Applied Catalysis A: General 192 (2000) 105-123.
(Continued)

*Primary Examiner* — Prem C Singh
*Assistant Examiner* — Brandi M Doyle
(74) *Attorney, Agent, or Firm* — Maschoff Brennan

(57) ABSTRACT

The invention provides for a process and apparatus for simultaneous conversion of lighter and heavier hydrocarbon feedstocks into improved yields of light olefins in the range of C2 to C4, liquid aromatics in the range C6 to C8 mainly benzene, toluene, xylene and ethyl benzene and other useful products employing at least two different reactors operated in series with respect to catalyst flow and parallel with respect to feed flow under different regimes and process conditions with same catalyst system.

17 Claims, 1 Drawing Sheet

(51) Int. Cl.
*B01J 8/00* (2006.01)
*B01J 8/18* (2006.01)
*C10G 11/18* (2006.01)
*C10G 51/06* (2006.01)

(52) U.S. Cl.
CPC ............ *C10G 11/185* (2013.01); *C10G 51/06* (2013.01); *B01J 2208/00752* (2013.01); *B01J 2208/00911* (2013.01); *C10G 2300/104* (2013.01); *C10G 2300/107* (2013.01); *C10G 2300/1044* (2013.01); *C10G 2300/1059* (2013.01); *C10G 2300/1074* (2013.01); *C10G 2300/1077* (2013.01); *C10G 2300/301* (2013.01); *C10G 2300/4018* (2013.01); *C10G 2300/4025* (2013.01); *C10G 2300/4093* (2013.01); *C10G 2300/703* (2013.01); *C10G 2300/708* (2013.01); *C10G 2300/807* (2013.01); *C10G 2400/02* (2013.01); *C10G 2400/20* (2013.01); *C10G 2400/28* (2013.01); *C10G 2400/30* (2013.01)

(56) References Cited

U.S. PATENT DOCUMENTS

| | | |
|---|---|---|
| 2,492,948 A | 1/1950 | Berger |
| 2,662,050 A | 12/1953 | Moorman et al. |
| 3,082,165 A | 3/1963 | Kroeper et al. |
| 3,776,838 A | 12/1973 | Youngblood et al. |
| 3,928,172 A * | 12/1975 | Davis, Jr. ............... C10G 11/18 208/120.01 |
| 4,287,048 A | 9/1981 | Gladrow et al. |
| 4,374,750 A | 2/1983 | Vickers et al. |
| 4,402,913 A * | 9/1983 | McKinney ................ 422/110 |
| 4,547,616 A * | 10/1985 | Avidan ..................... C07C 1/20 585/639 |
| 4,606,810 A | 8/1986 | Krambeck et al. |
| 4,840,928 A | 6/1989 | Harandi et al. |
| 4,966,681 A * | 10/1990 | Herbst et al. ................ 208/74 |
| 4,980,053 A | 12/1990 | Li et al. |
| 5,160,424 A | 11/1992 | Le et al. |
| 5,215,650 A | 6/1993 | Sapre |
| 5,232,580 A | 8/1993 | Le et al. |
| 5,314,610 A * | 5/1994 | Gartside ........................ 208/80 |
| 5,318,689 A | 6/1994 | Hsing et al. |
| 5,326,465 A | 7/1994 | Yongqing et al. |
| 5,549,813 A | 8/1996 | Dai et al. |
| 5,637,207 A | 6/1997 | Hsing et al. |
| 5,846,402 A * | 12/1998 | Mandal et al. ............... 208/113 |
| 5,846,403 A | 12/1998 | Swan et al. |
| 6,113,776 A | 9/2000 | Upson |
| 6,210,562 B1 | 4/2001 | Xie et al. |
| 6,288,298 B1 | 9/2001 | Rodriguez et al. |
| 6,339,181 B1 * | 1/2002 | Chen et al. .................... 585/653 |
| 6,455,750 B1 | 9/2002 | Steffens et al. |
| 6,538,169 B1 | 3/2003 | Pittman et al. |
| 6,602,403 B1 | 8/2003 | Steffens et al. |
| 6,656,346 B2 | 12/2003 | Ino et al. |
| 6,867,341 B1 | 3/2005 | Abrevaya et al. |
| 7,029,571 B1 | 4/2006 | Bhattacharyya et al. |
| 7,087,155 B1 | 8/2006 | Dath et al. |
| 7,128,827 B2 | 10/2006 | Tallman et al. |
| 7,611,622 B2 | 11/2009 | Niccum et al. |
| 7,736,491 B2 * | 6/2010 | Baptista et al. ........... 208/120.1 |
| 2001/0042700 A1 | 11/2001 | Swan, III et al. |
| 2002/0003103 A1 | 1/2002 | Henry et al. |
| 2003/0220530 A1 | 11/2003 | Boelt et al. |
| 2004/0251166 A1 | 12/2004 | Alvarenga Baptista et al. |
| 2005/0070422 A1 | 3/2005 | Chen et al. |
| 2006/0010826 A1 | 1/2006 | Canteri |
| 2006/0016726 A1 * | 1/2006 | Steffens et al. ............... 208/113 |
| 2006/0108260 A1 | 5/2006 | Henry |
| 2008/0156696 A1 * | 7/2008 | Niccum et al. ................. 208/78 |
| 2010/0174125 A1 * | 7/2010 | Tyler et al. ..................... 585/311 |

FOREIGN PATENT DOCUMENTS

| WO | 02/26628 A1 | 4/2002 |
|---|---|---|
| WO | 2004/078881 A1 | 9/2004 |
| WO | 2006/098712 A | 9/2006 |

OTHER PUBLICATIONS

Haitao, S. et al., Effect of coke deposition on the remaining activity of FCC catalysts during gas oil and residue aracking, Catalysis Communications 16 (2011) 70-74.

* cited by examiner

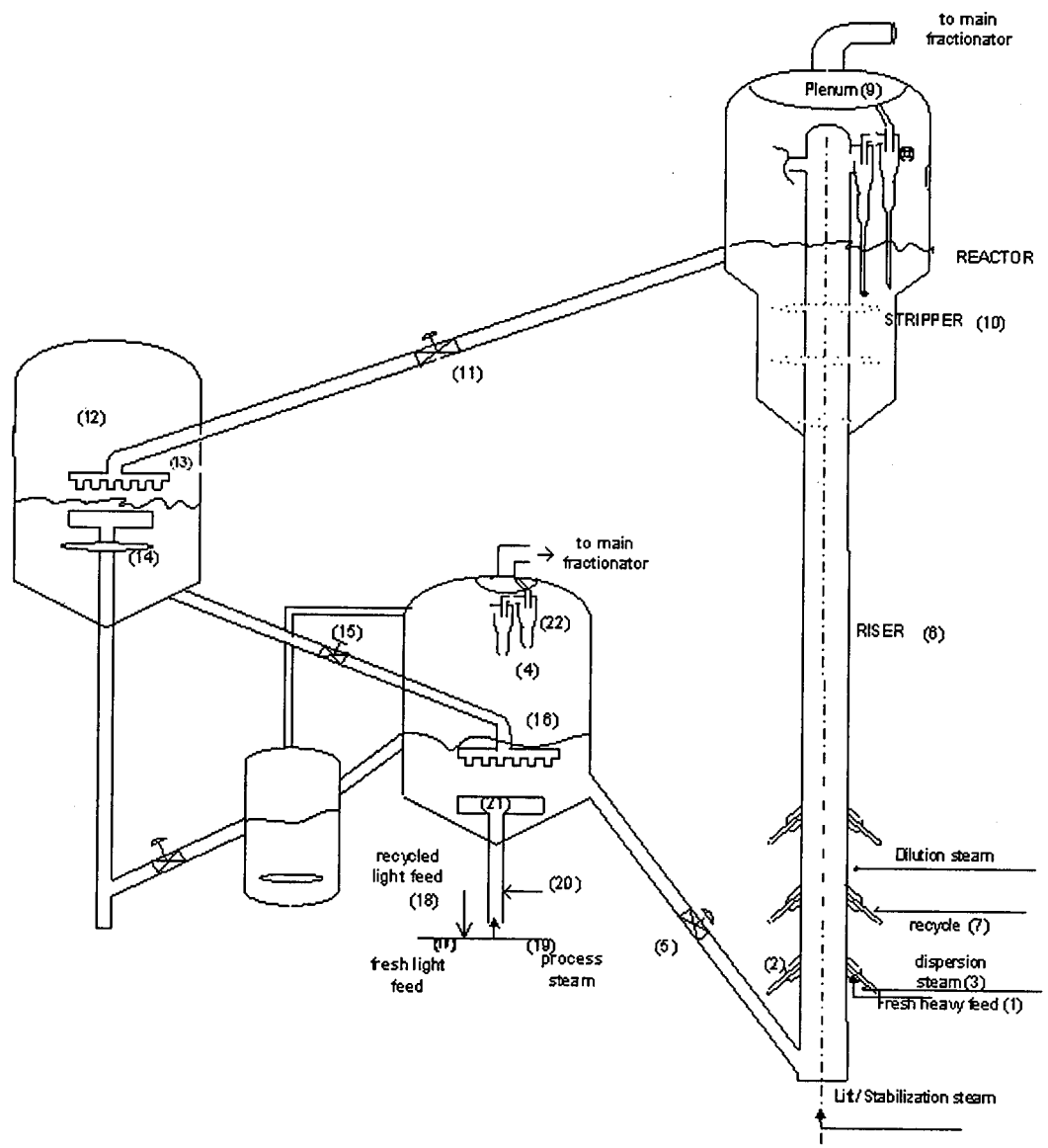

PROCESS FOR SIMULTANEOUS CRACKING OF LIGHTER AND HEAVIER HYDROCARBON FEED AND SYSTEM FOR THE SAME

FIELD OF THE INVENTION

The present invention relates to a process for simultaneous cracking of lighter and heavier hydrocarbon feedstocks. In this process the light and heavy feeds are processed in two different reactors operated in series with respect to catalyst flow and parallel with respect to feed flow to produce light olefins in the range of C2 to C4 and aromatic products in the range C6 to C8 mainly benzene, toluene, xylene and ethyl benzene and other useful products. The present invention also relates to an apparatus for simultaneous cracking of lighter and heavier hydrocarbon feeds.

BACKGROUND OF THE INVENTION AND PRIOR ART

Light olefins like ethylene, propylene and butylenes are considered as the major building blocks for the production of various petrochemicals. These chemicals are widely used for the production of polyethylene, polypropylene, di-isobutylene, polyisobutylene etc. Conventional steam cracking process remains the major source of light olefins, mainly ethylene and propylene to the petrochemical industry. In the emerging scenario, the demand growth of propylene as petrochemical feedstock is expected to be much higher than that of ethylene. Propylene is the major byproduct from the steam cracking process, which contributes about 70 % of world's propylene demand. About 30% of world's propylene demand is from the conventional Fluid Catalytic Cracking (FCC) units. In recent years, there is a significant gap between the demand and supply of propylene. Consequently, the industry is in the lookout for technology for augmenting production of light olefins. To bridge the gap between the demand and supply of propylene, a new catalytic process is required for production of propylene as the primary product.

Fluid Catalytic Cracking (FCC) process is well known since 1942. The history and the evolution of FCC process at various generations are detailed in the book "Fluid Catalytic Cracking Handbook" by Reza Sadeghbeigi, Gulf publishing company, "Fluid Catalytic Cracking" by Wilson, and various other literatures.

In general, cracking is defined as breaking down of hydrocarbons of higher molecular weight into lower molecular weight hydrocarbons. It can be carried out thermally or catalytically. In fluid catalytic cracking process, the catalyst is a fluidizable fine particle in the size range of 5-150 microns. The steps involved in the conventional FCC process are described below:

i. Hydrocarbon feedstock is preheated to a temperature range of 150-400° C. to enhance the atomization/vaporization of feed;

ii. The preheated feed is mixed with the steam at particular ratio and passed through a nozzle to disperse the feed into fine droplets inside an up-flow riser;

iii. The dispersed feed gets contacted with the hot regenerated catalyst at the bottom of the riser, where the reactions are initiated to take place along the remaining length of the riser;

iv. The mixture of catalyst and products of catalytic cracking is separated by a termination device; further, the entrained catalyst is separated from the product vapor by cyclone separators and transferred to the catalyst bed in the reactor stripper;

v. The entrapped hydrocarbon components are removed from the separated catalyst by stripping using steam;

vi. The coke laden fluidizable catalyst, often referred as spent catalyst, is transferred to a regenerator through spent catalyst standpipe and spent catalyst slide valve;

vii. The deposited coke in the catalyst is burnt in the regenerator using air and the hot regenerated catalyst is transferred to riser through regenerated catalyst standpipe and regenerated catalyst slide valve for the next cycle of operation.

In this manner, FCC process is termed as a cyclic process where the reaction and regeneration takes place continuously in a riser (reactor) and regenerator respectively. A particular amount of fresh catalyst is added to the circulating inventory in order to maintain the activity of the catalyst while keeping the inventory at constant level.

In the present scenario, as worldwide crudes are becoming heavier, processing of heavy crudes has become important, especially to increase the profit margin. Because of this, it is preferable to maximize the intake of vacuum residue or atmospheric residue in feed to FCC/RFCC unit. However, increase in concentration of heavy ends in FCC unit feed will have several deleterious effects in the known resid FCC units. The associated problems in processing heavy residue in the FCC units are as follows:

i. Excessive coke with the residue produces large amount of excess heat in the regenerator and therefore, the heat balance of the reactor regenerator results in lower conversion.

ii. Higher metal level on the resid leads to significant deactivation of the catalyst and requires incremental catalyst addition to keep the metal level on equilibrium catalyst within acceptable range.

Crackability of some of the residues, in particular aromatic residues, are not quite good leading to lower conversion.

iii. Strippability of the heavier unconverted residue inside the catalyst pores is not efficient resulting in higher regenerator temperature and thereby lower conversion.

The excessive coke in the catalyst generates lot of heat while burning in the regenerator, which limits the catalyst circulation rate to the riser reactor zone, thereby reduces the overall conversion. In order to mitigate this problem catalyst coolers are used conventionally in the resid FCC units, which cools the catalyst indirectly using steam/water as the coolant. These coolers are disclosed in the U.S. Pat. Nos. 2,377,935, 2,386,491, 2,662,050, 2,492,948, and 4,374,750.

U.S. Pat. No. 5,215,650 discloses the indirect cooling of the hot regenerated catalyst via shell and tube heat exchanger type reactor where cracking of light alkanes like ethane, propane and butane takes place and then the cooled catalyst is transferred to the riser reactor.

U.S. Pat. No. 4,840,928 discloses the process of converting lower alkanes to olefins in a third bed, external catalyst cooler in which the excess heat from the regenerator is used directly for thermal cracking of lower alkanes mainly propane with a WHSV of not exceeding 5 $hr^{-1}$ in the said reactor.

Production of light olefins from feed stocks like VGO is disclosed in the U.S. Pat. Nos. 6,656,346, 4,980,053, 6,210,562, 5,846,402, 6,538,169, 5,326,465, and U.S2006/0108260.

Production of light olefins from naphtha range feed stocks are disclosed in several documents like U.S. Pat. Nos. 4,287,048, 5,232,580, 5,549,813, 6,288,298, 3,082,165, 3,776,838, 5,160,424, 5,318,689, 5,637,207, 5,846,403, 6,113,776, 6,455,750, 6,602,403, 6,867,341, 7,087,155, US2001/042700, US2002/003103, US2003/220530, US2005/070422, US2006/10826, WO2000/18853, WO2002/26628, WO2004/078881, WO2006/098712. Catalytic Cracking of lighter feedstocks like propane, straight run naphtha, olefinic naphtha to produce significant yields of light olefins has its own limitation for commercial realization due to its less coke which affects the heat balance of the unit i.e. the coke produced during the reaction is not sufficient to produce the enough heat which is required for cracking of lighter feeds.

U.S. Pat. No. 7,611,622B2 discloses a dual riser Fluid catalytic cracking (FCC) process with common regenerator involves cracking of first hydrocarbon feed in first riser and cracking of second hydrocarbon feed comprising light hydrocarbons including C3 and/or C4 hydrocarbons, in second riser to form second effluent enriched in light olefins and aromatics. Moreover this invention uses gallium included catalyst to promote aromatics formation.

Chinese patent CN101522866A discloses a dual riser FCC process, wherein first and second hydrocarbon feeds (first hydrocarbon is olefin and the second hydrocarbon feed is paraffinic) are supplied to the respective first and second risers to make an effluent rich in ethylene, propylene and/or aromatics and the respective risers can have different conditions to favor conversion to ethylene and/or propylene.

Some patent literatures, like U.S. Pat. No. 6,113,776, US2002/0003103, U.S. Pat. No. 7,128,827 disclose the concept of dual riser or multiple riser cracking where the portion of the catalyst is used for cracking the lighter hydrocarbons like naphtha range feed stocks and the other portion of catalyst is used in the conventional FCC riser. U.S. Pat. No. 5,846,403 discloses the process in which the naphtha is injected in the same reaction zone but at different elevations of the riser reactor.

None of the cited patents mention about the simultaneous catalytic cracking of lighter feed stocks and heavier feed stocks in different reactors operating in different regimes and conditions to produce significant amount of light olefins and aromatics like benzene toluene, xylene, ethyl benzene etc.

An aim of the present invention is to provide a new catalytic cracking process for simultaneously cracking lighter and heavier hydrocarbon feedstock to produce light olefins and liquid aromatic products.

Another aim is to provide a multiple reaction zone system that enables the production of light olefins and liquid aromatic products both from lighter and heavier hydrocarbon cracking.

Yet another aim of the invention is to provide a catalyst system that can crack both lighter and heavier hydrocarbon under wide range of operating conditions.

A further aim of the present invention is to reduce the sulfur content of the cracked products boiling in the range of C5 to 150° C. from first reaction zone by not less than 60 wt %.

Another aim of the invention is to utilize the excess heat generated in the regenerator due to excess coke burning, which in turn is due to processing of heavier feedstocks in the second reaction zone, effectively in the first reaction zone for cracking of lighter hydrocarbon feedstocks, thereby reducing the temperature of the catalyst entering into the second reaction zone.

Another aim of the invention is to provide a suitable apparatus for carrying out the said new catalytic process.

SUMMARY OF THE INVENTION

The present invention discloses a catalytic cracking process in which lighter hydrocarbon feed stocks like propane, butane, isobutane, n-butenes, isobutene, straight run naphtha, visbreaker naphtha, coker naphtha, FCC naphtha, hydrocracker and hydrotreater naphthas, natural gas condensate, LPG condensate, gas well condensate are processed in the first reaction zone utilizing the excess heat of regenerated catalyst due to processing of heavier feedstocks in the second reaction zone using single catalyst composition.

DESCRIPTION OF THE INVENTION

The present invention provides a process for simultaneous catalytic cracking of lighter and heavier hydrocarbon feedstocks into improved yields of light olefins, liquid aromatics and other useful products in multiple reaction zones in different reactors operating under different regimes and conditions comprising the steps of:

a) cracking the lighter hydrocarbon feedstock in a first reaction zone in the first reactor to get a first reactor effluent mixture;

b) separating the first reactor effluent mixture of step (a) into a vapor rich phase and a solid rich phase;

c) separating the vapor rich phase of step (b) in a product separator into C5− fractions as the light olefins product and C5+ fractions;

d) recycling the C5+ fractions back to the first reaction zone and continuing the cracking operation until the aromatics concentration in C5+ fraction reaches more than 90 wt %;

e) stripping a portion of the solid rich phase of step (b) containing coke laden catalyst using steam to remove entrapped hydrocarbons along with vapor rich phase entering the product separator;

f) transferring the remaining portion of the solid rich phase of step (b) containing coke laden catalyst from the first reaction zone to a second reaction zone of a second reactor, cracking the heavier hydrocarbon feedstock therein at a relatively lesser temperature and pressure as compared with those in the first reaction zone to get a second reactor effluent mixture;

g) separating the effluent mixture of step (f) into a vapor rich phase and a solid rich phase containing coke laden spent catalyst;

h) fractionating the vapor rich phase of step (g) to get different cracked products;

i) stripping the solid rich phase of step (g) using steam to remove entrapped hydrocarbons along with vapor rich phase of step (g);

j) regenerating the coke laden stripped spent catalyst obtained from step (i) and step (e) in a common catalyst regenerator using air and/or an oxygen containing gas to produce an active regenerated catalyst for recirculating to the first reaction zone through regenerated catalyst standpipe and regenerated catalyst slide valve for the next cycle of operation.

This invention also provides a multi-reactor fluidized bed catalytic cracking apparatus for the production of light olefins and liquid aromatics etc. through simultaneous cracking of lighter and heavier hydrocarbon feedstocks in separate reaction zones comprising at least a first reaction zone in a first reactor (4), a second reaction zone in a second reactor (6) and a catalyst regenerator (12).

According to the said process lighter hydrocarbon feed is cracked with steam in a molar ratio in the range of 1:60 and 60:1 in a bubbling or turbulent bed first reaction zone with a hot regenerated catalyst mixture operated in a temperature range of 500 to 750° C. and pressure in the range of 1 to 5 kg/cm$^2$ to obtain first reactor effluent mixture comprising cracked hydrocarbon product vapor and a coke laden catalyst. The first reactor effluent mixture is separated into a vapor rich phase and a solid rich phase containing the coke laden catalyst. The vapor rich phase is cooled and separated into C5− and C5+ fractions in a separator and the C5+ fraction is recycled to the first reaction zone until the aromatics concentration in C5+ product from the first reaction zone reaches more than 90 wt %. A portion of the solid rich phase containing coke laden catalyst is stripped using steam to remove entrapped hydrocarbons along with the vapor rich phase entering into the product separator. The remaining portion of hot coke laden spent catalyst is transferred from first reaction zone to second reaction zone comprising a riser operating in fast fluidization regime or pneumatic conveying regime, the heavier hydrocarbon feed stock is cracked in the second reaction zone operated in the temperature range of 450 to 700° C. and pressure in the range of 0.9 to 4.9 kg/cm$^2$ to obtain a second reactor effluent. The second reactor effluent is separated into a vapor rich phase and a solid rich phase containing coke laden catalyst. The vapor rich phase is removed and fractionated to get the cracked products. The solid rich phase is stripped from the second reaction zone using steam to remove entrapped hydrocarbons along with vapor rich phase entering into the fractionating column for separation into products. The coke laden catalyst obtained from second stripping zone and the coke laden catalyst obtained from first stripping zone are regenerated in a common regenerator using air and/or oxygen containing gas to produce hot regenerated catalytic mixture.

An embodiment of the present invention provides a process for simultaneous cracking of lighter and heavier hydrocarbon feeds, further comprises transferring active hot regenerated catalytic mixture to the first reaction zone for the next cycle of operation.

Another embodiment of the present invention provides a process for simultaneous cracking of lighter and heavier hydrocarbon feeds, wherein the lighter hydrocarbon feed comprises. C3 fraction containing propane and propylene and C4 fraction containing n-butane, isobutane, isobutene, butene-1, cis-2-butene, trans-2-butene and hydrocarbons boiling upto 220° C. (true boiling point basis).

An embodiment of the present invention provides a process for simultaneous cracking of lighter and heavier hydrocarbon feeds, wherein the lighter hydrocarbon feed is selected from petroleum based light feed stock, such as propane, butane, isobutene, n-butenes, isobutane, straight run naphtha, visbreaker naphtha, coker naphtha, FCC naphtha, hydrocracker naptha, hydrotreated naphtha, natural gas condensate, LPG condensate and gas well condensate or mixtures thereof.

Yet another embodiment of the present invention provides a process for simultaneous cracking of lighter and heavier hydrocarbon feeds, wherein the lighter hydrocarbon feed is preferably selected from straight run naphtha, visbreaker naphtha, coker naphtha, FCC naphtha, Hydrocracker and hydrotreater naphtha, natural gas condensate, LPG condensate, and Gas well condensate or mixture thereof.

It is an embodiment of the present invention to provide a process, wherein the cracking operation in the first reaction zone is carried out at a temperature of 500-750° C., preferably at a temperature of 550-700° C., pressure of 1 to 5 Kg/cm$^2$ and WHSV of 1 to 200 hr$^{-1}$ preferably at a WHSV of 6 to 120 hr$^{-1}$, whereas the said operation is carried out in the second reaction zone at a temperature of 450-700° C., preferably at 480-600° C., pressure of 0.9 to 4.9 Kg/cm$^2$ and WHSV of 10 to 400 hr$^{-1}$, preferably at 60-250 hr$^{-1}$.

Further embodiment of the present invention provides a process for simultaneous cracking of lighter and heavier hydrocarbon feeds, wherein the heavier hydrocarbon feed has an initial boiling point of more than 220° C.

Another embodiment of the present invention provides a process for simultaneous cracking of lighter and heavier hydrocarbon feeds, wherein the heavier hydrocarbon feed is selected from petroleum based heavy feed stock, such as vacuum gas oil (VGO), visbreaker/coker heavy gas oil, fuel oil, coker fuel oil, hydrocracker bottoms, vacuum slop, cycle oils, foots oil, slurry oils, atmospheric gas oil, atmospheric residue and vacuum residue or mixtures thereof.

Still another embodiment of the present invention provides a process for simultaneous cracking of lighter and heavier hydrocarbon feeds, wherein the Conradson carbon residue of the heavier hydrocarbon feeds is in the range of 0.1-15 wt %.

Yet another embodiment of the present invention provides a process for simultaneous cracking of lighter and heavier hydrocarbon feeds, wherein the Conradson carbon residue of the heavier hydrocarbon feeds is more than 3 wt %.

Hydrocarbon feed for the present invention comprises hydrocarbon fractions starting from carbon number 3 to carbon number 100 and above. The lighter hydrocarbon fraction could be propane, butane, isobutane, n-butenes, isobutene, straight run naphtha, visbreaker naphtha, coker naphtha etc. and the heavier hydrocarbon fraction could be straight run, light and heavy vacuum gas oil, hydrocracker bottom, heavy gas oil fractions from hydrocracking, FCC, visbreaking or delayed coking, atmospheric residue, vacuum residue, vacuum slops etc. The conditions in the process of the present invention are adjusted depending on the type of the feedstock so as to maximize the yield of light olefins and liquid aromatic products like benzene, toluene, xylene, ethyl benzene etc. The above feedstock types are for illustration only and the invention is not limited in any manner to only these feedstocks.

Further embodiment of the present invention provides a process for simultaneous cracking of lighter and heavier hydrocarbon feeds, wherein the catalyst is made up of solid micro-spherical acidic materials with average particle size of 60-80 micron and apparent bulk density of 0.7-1.0 gm/cc.

Another embodiment of the present invention provides a process for simultaneous cracking of lighter and heavier hydrocarbon feeds, wherein the catalyst is specifically designed to handle both the lighter and heavier feed stocks in first and second reaction zones respectively to selectively produce light olefins like ethylene, propylene and aromatic liquid products like benzene, toluene, xylene, ethyl benzene etc.

The catalyst employed in the process of the present invention is having unique composition which comprises Y-zeolite in rare earth ultra-stabilized form, bottom cracking components consists of peptized alumina, acidic silica alumina or gamma-alumina, pentasil shape selective zeolites or a mixture thereof. It may be noted that both the first and second stage reaction zone are charged with the same catalyst and its composition is designed in such a way that it can optimally crack both the lighter and heavier hydrocarbon feed. It may also be noted that conventional FCC catalyst mainly consists of Y-zeolite in different forms as active ingredient to accomplish catalytic cracking reactions.

In the process of the present invention, the active catalyst components are supported on relatively inactive materials such as silica/alumina or silica-alumina compounds, including kaolinites or with active matrix components like pseudobomite alumina. The active components could be mixed together before spray drying or separately binded, supported and spray-dried using conventional spray drying technique. The spray-dried micro-spheres are washed, rare earth exchanged and flash dried to produce finished catalyst particles. The finished micro-spheres containing active materials in separate particles are physically blended in the desired composition.

Still another embodiment of the present invention provides a process for simultaneous cracking of lighter and heavier hydrocarbon feeds, wherein the lighter hydrocarbon and steam at saturated or at superheated conditions are mixed in the zone prior to the contact with the catalyst and uniformly distributed using any of the conventional distributors like manifold type, concentric ring type, perforated plate type, etc. into the first reaction zone.

Further embodiment of the present invention provides a process for simultaneous cracking of lighter and heavier hydrocarbon feeds, wherein the lighter hydrocarbon feed and steam at saturated or at superheated conditions are uniformly contacted with hot catalyst from the common regenerator in the first reaction zone.

Another embodiment of the present invention provides a process for simultaneous cracking of lighter and heavier hydrocarbon feeds, wherein the ethylene to propylene ratio in the first reaction zone can be varied by tuning the steam to hydrocarbon feed mole ratio in the range of 1:60 and 60:1 along with changes in the process variables.

Yet another embodiment of the present invention provide a process for simultaneous cracking of lighter and heavier hydrocarbon feeds, wherein the coke on the catalyst from the first reaction zone is not more than 0.35 wt %.

Further embodiment of the present invention provides a process for simultaneous cracking of lighter and heavier hydrocarbon feeds, wherein the regenerator can be a single stage or multistage to burn the entire coke laden spent catalyst to form regenerated catalyst with coke content not exceeding 0.09 wt %.

Another embodiment of the present invention provides a process for simultaneous cracking of lighter and heavier hydrocarbon feeds, wherein the sum of yields of ethylene plus propylene is not less than 25 wt % in the first reaction zone and not less than 15 wt % in the second reaction zone.

Another embodiment of the present invention provides a process for simultaneous cracking of lighter and heavier hydrocarbon feeds, wherein the excess heat generated in the regenerator due to processing of heavy feedstocks in the second reaction zone is utilized effectively for cracking the lighter hydrocarbon feedstock at very high temperatures in the first reaction zone.

Still another embodiment of the present invention provides a process for simultaneous cracking of lighter and heavier hydrocarbon feeds, wherein the common regenerator can be a single stage or multistage to burn the entire coke laden spent catalyst to form regenerated catalyst with coke content not exceeding 0.09 wt % and thus meeting the heat requirement of the first and second reaction zones.

Another embodiment of the present invention is to provide a process for simultaneous cracking of lighter and heavier hydrocarbon feeds, wherein the light and the heavy feeds are processed in two different reactors operated in series with respect to catalyst flow and parallel with respect to feed flow to produce light olefins in the range of C2 to C4 and aromatic products in the range C6 to C8 mainly benzene, toluene, xylene and ethylbenzene.

Another embodiment of the present invention provides a process for simultaneous cracking of lighter and heavier hydrocarbon feeds, wherein C5+ fraction of the products from first reaction zone is recycled to the first reaction zone and the cracking operation is continued until the aromatics concentration in C5+ fraction reaches more than 90 wt %.

Yet another embodiment of the present invention is to provide a process for simultaneous cracking of lighter and heavier hydrocarbon feeds, wherein the liquid product boiling in the range of C5 to 220° C. from both first and second reaction zones rare separated to produce various petrochemical feedstocks primarily benzene, toluene, xylene and ethylbenzenec.

Further embodiment of the present invention is to provide a catalytically cracked product, wherein the propylene to ethylene ratio in the products from second reaction zone is not less than 2.5:1.

The conversion in the second reaction zone defined as sum of all products boiling less than or equal to 220° C. plus coke is not less than 70 wt %.

Yet another embodiment of the present invention is to provide a process for cracking lighter and heavier hydrocarbon feedstock simultaneously, wherein there is a multiple reaction zone system that enables the production of light olefins and liquid aromatic products both from lighter and heavier hydrocarbon cracking.

An embodiment of the present invention is to provide a catalyst system that can crack both lighter and heavier hydrocarbon under wide range of operating conditions.

Further embodiment of the present invention is to reduce the sulfur content of the cracked products boiling in the range of C5 to 150° C. from first reaction zone by not less than 60 wt %.

Another embodiment of the present invention is to utilize the excess heat generated in the regenerator due to burning of excess coke produced by the cracking of heavier feedstocks in the second reaction zone, effectively in the first reaction zone for cracking of lighter hydrocarbon feedstocks thereby reducing the temperature of the catalyst entering into the second reaction zone.

The main products in the process of the present invention are the light olefins and liquid aromatic products in the range C6 to C8 mainly benzene, toluene and xylene. Light olefins include ethylene, propylene, isobutylene, trans-2-butene, cis-2-butene, butene-1 etc. Other useful products of the present invention comprise LPG (C3 and C4), Gasoline (C5-150° C.), Heavy naphtha (150° C.-216° C.), Light Cycle oil (216-370° C.) and Bottoms (370° C.+).

DETAIL DESCRIPTION OF THE INVENTION

FIG. 1 shows a fluidized bed cracking apparatus with multiple reaction zones according to the present invention.

Fluidized catalytic cracking (FCC) process of the present invention to produce light olefins and aromatics rich liquid products etc. through simultaneous cracking of light and heavy feeds in separate reaction zones utilizes at least two reactors. Fresh heavy feed (1) is injected at the bottom of the riser through a single or multiple feed nozzle (2), wherein the heavy feed is mixed with the dispersion steam (3) so as to enable the better atomization of the feed molecules in the riser. The hot partially coked catalyst from the first reactor (4) enters into the bottom of the riser (6) through the slide valve (5) whereupon it comes into contact with the atomized feed. The catalyst along with hydrocarbon feed and product vapors ascend the riser, wherein the recycle slurry (7) gets in to contact with the catalyst for re-cracking. The entire mixture of catalyst, products and unconverted feed ascend the riser and at the end of the riser coked spent catalyst is separated from the hydrocarbon vapor in the riser termination device (8). The hydrocarbon vapors leaving from the riser reactor are sent to a main fractionator column via plenum chamber (9) for separating into the desired products. The coked catalyst is subjected to steam stripping in a stripper (10) to remove the entrapped hydrocarbons from the catalyst. The stripped catalyst is passed to a regenerator (12) through a slide valve (11) and distributed via spent catalyst distributor (13) where the coke deposited on the catalyst is burnt off by means of air or any oxygen containing gas which is distributed through the air distributor (14).

The clean hot catalyst from the regenerator passes through the slide valve (15) and distributed in the fluidized dense bed reactor (4) through the regenerated catalyst distributor (16). Preheated fresh light feed (17) and recycled light feed (18) are mixed with the process steam (19) at the bottom of the conduit (20) and distributed in the light feed distributor (21) where upon it gets contacted with the clean hot regenerated catalyst. The cracked products along with entrained catalyst is separated in the separation device (22) wherein the product of cracking is separated from the entrained catalyst and sent to the fractionation column to separate into various products. The partially coked catalyst from reactor (4) is circulated back to the bottom of the riser through the slide valve (5).

The invention and its embodiments are described in further details hereunder with reference to the following examples which should not be construed to limit the scope of the invention in any manner. Various modifications of the invention that may be apparent to those skilled in the art are deemed to be included within the scope of the present invention.

EXAMPLE-1

Yield of Light Olefins at Different Conversions in Conventional FCC Operation

This example illustrates the change in yield of the light olefins at different conversion levels under conventional FCC conditions. 216° C. conversion is defined as the total quantity of products boiling below 216° C. including coke. The experiments were conducted in standard fixed bed Micro Activity Test (MAT) reactor described as per ASTM D-3907 with minor modifications indicated subsequently as modified MAT. The catalyst is steamed at 810° C. for 3 hours in presence of 100% steam prior to conducting the experiments. The properties of Feed-A used in the modified MAT reactor are given in the Table-1.

TABLE 1

Properties of Feed-A

| | Unit | Feed-A |
|---|---|---|
| Property | | |
| Density @ 15° C. | gm/cc | 0.9116 |
| Sulfur | wt % | 1.37 |
| CCR | wt % | 0.17 |
| Basic Nitrogen | ppmw | 489 |
| Saturates (Paraffin + naphthene) | wt % | 62.6 |
| Aromatics | wt % | 37.4 |
| Distillation, ASTM D-1160 | | |
| 5 vol % | ° C. | 395 |
| 10 vol % | ° C. | 410 |
| 30 vol % | ° C. | 445 |
| 50 vol % | ° C. | 470 |
| 70 vol % | ° C. | 495 |

TABLE 1-continued

Properties of Feed-A

| | Unit | Feed-A |
|---|---|---|
| 90 vol % | ° C. | 545 |
| 95 vol % | ° C. | 570 |

The runs were, taken at a reaction temperature of 511° C., feed injection time of 30 seconds with different severities by varying feed rate with the same catalyst loading. Catalysts used in this example catalyst A which is a commercially available FCC catalyst having physico-chemical characteristics as shown in the Table below.

| | | CAT-A |
|---|---|---|
| Activity | wt % | 63.9 |
| $Al_2O_3$ | wt % | 40.42 |
| $Re_2O_3$ | wt % | 2.63 |
| SA | $m^2$/gm | 145 |
| PV | cc/gm | 0.293 |
| ABD | gm/cc | 0.89 |
| APS | micron | 103 |
| Crystalinity | % | 9.1 |
| UCS | ° A | 24.30 |

In all the examples, Dry gas is defined as the product comprising C1 and C2 hydrocarbons, and hydrogen, while LPG is defined as the product comprising C3 and C4 hydrocarbons.

TABLE 2

Effect of severity on product yields

| Reaction Severity, W/F, min | 0.69 | 0.86 | 1.07 | 1.46 |
|---|---|---|---|---|
| Yields, wt % | | | | |
| Hydrogen | 0.05 | 0.06 | 0.06 | 0.10 |
| Ethylene | 0.64 | 0.90 | 0.97 | 1.14 |
| Dry gas | 1.13 | 1.39 | 1.73 | 2.19 |
| Propylene | 2.79 | 3.47 | 3.98 | 4.55 |
| But-1-ene | 0.83 | 0.99 | 1.08 | 1.19 |
| Isobutene | 1.26 | 1.37 | 1.42 | 1.39 |
| trans-2 Butene | 1.31 | 1.54 | 1.63 | 1.73 |
| Cis-2-Butene | 0.80 | 0.94 | 1.00 | 1.06 |
| LPG | 7.35 | 9.13 | 11.00 | 13.09 |
| Gasoline (C5-150° C.) | 24.01 | 28.36 | 31.42 | 35.40 |
| Hy. Naphtha (150-216° C.) | 13.01 | 14.04 | 14.80 | 14.96 |
| LCO (216-370° C.) | 25.68 | 25.23 | 24.20 | 21.93 |
| 216 Conversion, wt % | 46.62 | 54.35 | 60.84 | 68.28 |

The product yields along with conversions are given in Table-2 wherein it is observed that with increase in severity conversions increases along with the increase in ethylene and propylene yields.

EXAMPLE-2

Yields of Light Olefins and Aromatics from Naphtha Cracking in Conventional FCC Operation This example illustrates the yield of the light olefins at conventional FCC naphtha cracking operation. Cracking experiments are carried out at 500° C. at the catalyst to oil ratio of 5.11. properties of the Feed-B used in the modified MAT reactor are given in the following Table-3.

TABLE 3

Properties of Feed-B

| Property | Unit | Feed-B |
| --- | --- | --- |
| Density @ 15° C. | gm/cc | 0.7358 |
| Sulfur | PPM | 18 |
| Paraffin | wt % | 39.6 |
| Olefin | wt % | Nil |
| Naphthene | wt % | 47.7 |
| Aromatics | wt % | 12.7 |
| Benzene | | 0.83 |
| Toluene | | 3.1 |
| Xylene | | 4.25 |
| Distillation | | D-86 |
| 5 vol % | ° C. | 68.5 |
| 10 vol % | ° C. | 73.5 |
| 30 vol % | ° C. | 88 |
| 50 vol % | ° C. | 100.8 |
| 70 vol % | ° C. | 113 |
| 90 vol % | ° C. | 132 |
| 95 vol % | ° C. | 146.5 |

The light olefins yield is shown in the Table-4.

TABLE 4

Light olefins yield at 500° C.

| Reaction Severity, cat/oil | 5.11 |
| --- | --- |
| Yields, wt % | |
| Ethylene | 2.21 |
| Propylene | 4.72 |
| But-1-ene | 0.46 |
| Isobutene | 1.23 |
| trans-2 Butene | 0.75 |
| Cis-2-Butene | 0.61 |

EXAMPLE-3

Effect of Recycle of Cracked Naphtha

This example illustrates the effect of recycle of cracked naphtha on liquid aromatics yield. The product obtained from Example-2 is recycled back i.e. cracked at similar conditions as mentioned in Example-2. The yields of different aromatic products are shown in Table-5. This clearly indicates that there is a significant increase in aromatics yield in 2nd recycle product as compared to the first recycle product.

TABLE 5

Total aromatics content, % wt/wt

| Component | 1st Recycle FCC product | 2nd Recycle FCC product |
| --- | --- | --- |
| Benzene | 3.8 | 5.3 |
| Toluene | 15.4 | 24.8 |
| Ethyle benzene | 1.6 | 2.3 |
| m-p Xylene | 10 | 15.6 |
| o-xylene | 2.8 | 4.8 |
| n Propyl bebzene + methyl ethyl benzene | 1.4 | 0.3 |
| Tri methyl benzene + methyl butyl cyclopentane | 0.5 | 0.6 |
| Tri methyl benzene + methyl propyl cyclohexane | 1.4 | 2.9 |

EXAMPLE-4

Yields of Light Olefins in the First Reaction Zone Using Light Feed

This example illustrates the yield of light olefins and other useful products obtained in the first reaction zone of the present invention. The properties of feed used, the operating conditions maintained in the micro-reactor and the product yields are given in the Table-6

TABLE 6

| | Feed B | Feed C |
| --- | --- | --- |
| Feed properties | | |
| Density, g/cc @ 15° C. | 0.7358 | 0.7223 |
| Sulfur content, PPM | 18 | 1600 |
| IBP, ° C. | 51 | 45 |
| FBP, ° C. | 153 | 160 |
| Operating conditions | | |
| Reaction severity, W/F min | 1.94 | 3.41 |
| Reaction temperature, ° C. | 625 | 650 |
| Yield, wt % | | |
| Dry Gas | 13.62 | 25.44 |
| Ethylene | 8.17 | 14.76 |
| LPG | 39.48 | 37.75 |
| Propylene | 14.23 | 19.63 |
| Gasoline (C5-150° C.) | 38.63 | 30.42 |
| Heavy naphtha (150-216° C.) | 3.87 | 3.97 |
| LCO (216-370° C.) | 2.06 | 0 |
| CLO (370° C.+) | 0 | 0 |
| Coke | 2.34 | 2.42 |

EXAMPLE-5

Yields of Light Olefins in Second Reaction Zone Using Heavy Feed

This example illustrates the yield of light olefins and other useful products obtained in the second reaction zone of the present invention. The properties of feed used, the operating conditions maintained in the micro-reactor and the product yields are given in the Table-7

TABLE 7

| | Feed D | Feed E |
| --- | --- | --- |
| Feed properties | | |
| Density, g/cc @ 15° C. | 0.8938 | 0.845 |
| CCR, wt % | 0.3 | 0.013 |
| IBP, ° C. | 330 | 339 |
| FBP, ° C. | 560 | 523 |
| Operating conditions | | |
| Reaction severity, W/F min | 1.068 | 1.098 |
| Reaction temperature, ° C. | 580 | 580 |
| Yield, wt % | | |
| Dry Gas | 10.53 | 4.4 |
| Ethylene | 6.74 | 2.66 |
| LPG | 49.31 | 61.41 |
| Propylene | 23.65 | 25.9 |
| Gasoline (C5-150° C.) | 15.09 | 14.6 |
| Heavy naphtha (150-216° C.) | 5.31 | 3.54 |
| LCO (216-370° C.) | 9.12 | 6.18 |
| CLO (370° C.+) | 4.22 | 3.7 |
| Coke | 6.42 | 6.17 |
| Conversion 216° C. | 86.66 | 90.12 |

EXAMPLE-6

Effect of Temperature in the First Reaction Zone

This example illustrates the effect of temperature on yield of light olefins and other useful products obtained in the first reaction zone of the present invention. The properties of feed used, operating conditions maintained in the micro-reactor and the product yields are given in the Table-8

TABLE 8

|  | Feed F | Feed F |
|---|---|---|
| Feed properties |  |  |
| Density, g/cc @ 15° C. | 0.6952 | 0.6952 |
| IBP, ° C. | 52.8 | 52.8 |
| FBP, ° C. | 179.8 | 179.8 |
| Operating conditions |  |  |
| WHSV, hr−1 | 24.43 | 22.64 |
| Reaction temperature, ° C. | 660 | 700 |
| Product yields, wt % |  |  |
| Dry Gas | 26.57 | 39.45 |
| Ethylene | 14.21 | 23.67 |
| LPG | 37.2 | 30.56 |
| Propylene | 20.92 | 18.72 |
| Gasoline (C5-150° C.) | 28.97 | 18.94 |

It is evident that by increasing the temperature in the first reaction zone, the yields of both ethylene and propylene increases significantly.

EXAMPLE-7

Effect of Weighted Hour Space Velocity (WHSV) in First Reaction Zone

This example illustrates the effect of WHSV on yield of light olefins and other useful products obtained in the first reaction zone of the present invention using the same feed (Feed-F) as that of Example-6. The operating conditions maintained in the micro-reactor and the product yields are given in the Table-9

TABLE 9

| Operating conditions |  |  |  |
|---|---|---|---|
| WHSV, hr−1 | 19.01 | 26.95 | 40.32 |
| Reaction temperature, ° C. | 660 | 660 | 660 |
| Product yields, wt % |  |  |  |
| Dry Gas | 27.71 | 26.65 | 24.35 |
| Ethylene | 13.11 | 12.26 | 11.51 |
| LPG | 38.54 | 37.01 | 35.35 |
| Propylene | 23.39 | 22.45 | 21.28 |
| Gasoline (C5-150° C.) | 25.4 | 27.98 | 30.35 |

It is clear that by increasing the WHSV in the first reaction zone, the yields of both ethylene and propylene decreases. From Example-6 & 7, it is clear that the process conditions as well as the hydrodynamic regime is important in maximizing the yields of light olefins.

EXAMPLE-8

Combined Cracking of Light and Heavy Feed in Conventional FCC Operation Using Single Reaction Zone This example illustrates the yield of light olefins and other useful products obtained in the single reaction zone of the conventional FCC operation. The feed to the reactor comprises 15 wt % light feed mixed with 85 wt % of heavy feed. The combined feed properties, operating conditions maintained in the micro-reactor and the product yields are given in the Table-10

TABLE 10

|  | Feed G |
|---|---|
| Feed properties |  |
| Density, g/cc @ 15° C. | 0.8574 |
| CCR | 2.17 |
| Sulfur, PPM | 8500 |
| Operating conditions |  |
| Reaction temperature, ° C. | 540 |
| Product yields, wt % |  |
| Dry Gas | 4.8 |
| Ethylene | 2.0 |
| LPG | 35.6 |
| Propylene | 12.5 |
| Gasoline (C5-180° C.) | 40.4 |
| LCO | 12.1 |
| CLO | 2.4 |

EXAMPLE-9

Effect of Simultaneous Cracking of Light and Heavy Feed at Different Reaction Zone Operating at Different Conditions as Per Present Invention This example illustrates the yield of light olefins and other useful products obtained in the first and second reaction zone of the present invention. Light feed corresponding to 15 wt % of total feed of Example-8 is cracked in the first reaction zone at 680° C. and the heavy feed corresponding to 85 wt % of total feed of Example-8 is cracked simultaneously in the second reaction zone. The feed properties and the operating conditions maintained in the micro-reactor for first and second reaction zone along with product yields are given in the Table-11.

TABLE 11

|  | Reaction zone | |
|---|---|---|
|  | First<br>Feed H<br>(Light feed) | Second<br>Feed I<br>(Heavy feed) |
| Feed properties |  |  |
| Density, g/cc @ 15° C. | 0.6798 | 0.8988 |
| CCR | — | 2.55 |
| Sulfur, PPM | 5800 | 8980 |
| Operating conditions |  |  |
| Reaction temperature, ° C. | 680 | 540 |
| Product yields, wt % |  |  |
| Dry Gas | 31.78 | 5.1 |
| Ethylene | 17.48 | 2.3 |
| LPG | 35.36 | 39.7 |
| Propylene | 19.72 | 15.9 |
| Gasoline (C5-180° C.) | 29.36 | 36.1 |
| LCO | — | 13.5 |

It is clearly evident from the Example-8 and Example-9 that the sum of yields of ethylene and propylene is much superior in the present invention than that in the conventional process.

The embodiments of the present invention referred to in the above description and examples are for illustration only and not construed to be limitative. Other possible embodiments of the invention will be apparent to these skilled in the art from consideration of the specification and practice of the invention disclosed herein. The exact scope and spirit of the invention are intended to be governed by the following claims.

The invention claimed is:

1. A process for simultaneous conversion of lighter and heavier hydrocarbon feedstocks into improved yields of light olefins, liquid aromatics and other useful products by a continuous FCC operation in multiple reaction zones in different reactors operating under different regimes and conditions comprising the steps of:
   a) cracking the lighter hydrocarbon feedstock along with steam in the molar ratio of 1:60 to 60:1 in a bubbling or turbulent bed first reaction zone in the first reactor to get a first reactor effluent mixture;
   b) separating the first reactor effluent mixture of step (a) into a vapor rich phase and a solid rich phase;
   c) separating the vapor rich phase of step (b) in a product separator into C5− and C5+ fractions;
   d) recycling the C5+ fractions back to the first reaction zone and continuing the cracking operation until the aromatics concentration in C5+ fractions reaches more than 90 wt %;
   e) stripping a portion of the solid rich phase of step (b) containing coke laden catalyst using steam to remove entrapped hydrocarbons along with vapor rich phase entering the product separator:
   f) transferring the remaining portion of solid rich phase of step (b) containing coke laden catalyst of step (b) from the first reaction zone to a second reaction zone of a second reactor, cracking the heavier hydrocarbon feedstock therein at a relatively lesser temperature and pressure as compared with those in the first reaction zone to get a second reactor effluent mixture, wherein coke on the catalyst from the first reaction zone does not exceed 0.35 wt %;
   g) separating the effluent mixture of step (f) into a vapor rich phase and a solid rich phase containing coke laden spent catalyst;
   h) fractionating the vapor rich phase of step (g) to get different cracked products;
   i) stripping the solid rich phase of step (g) using steam to remove entrapped hydrocarbons along with vapor rich phase of step (g); and
   j) regenerating the coke laden stripped spent catalyst obtained from step (i) and step (e) in a common catalyst regenerator using air and/or an oxygen containing gas to produce an active regenerated catalyst for recirculating to the first reaction zone through regenerated catalyst standpipe and regenerated catalyst slide valve for the next cycle of operation.

2. The process as claimed in claim 1, wherein the lighter feedstock is hydrocarbon fraction boiling up to 220° C. starting from C3 hydrocarbon and the heavier one is hydrocarbon fraction having initial boiling point above 220° C. and Conradson Carbon Residue up to 15 wt %.

3. The process as claimed in claim 1, wherein the light olefin products are in the range of C2 to C4, comprising ethylene, propylene, isobutylene, trans-2-butene, cis-2-butene, butene-1 and the liquid aromatics are in the range of C6 to C8, comprising benzene, toluene, xylenes and ethylbenzene while other useful products comprise LPG (C3 and C4), gasoline (C5-150° C.), heavy naphtha (150-216° C.), light cycle oil (216-370° C.), bottoms (370° C+).

4. The process as claimed in claim 1, wherein the cracking operation in the first reaction zone is carried out at a temperature of 500-750° C., pressure of 1 to 5 Kg/cm$^2$ and WHSV of 1 to 200 hr$^{-1}$ whereas in the second reaction zone at 450-700° C., 0.9 to 4.9 Kg/cm$^2$ and 10 to 400 hr$^{-1}$ respectively.

5. The process as claimed in claim 4, wherein the cracking operation in the first reaction zone is carried out preferably at a temperature of 550-700° C. whereas in the second reaction zone preferably at 480-600° C. respectively.

6. The process as claimed in claim 4, wherein the cracking operation in the first reaction zone is carried out preferably at a WHSV of 6 to 120 hr$^{-1}$ whereas in the second reaction zone preferably at 60-250 hr$^{-1}$ respectively.

7. The process as claimed in claim 1, wherein the lighter hydrocarbon feedstock include straight run naphtha, visbreaker naphtha, coker naphtha, FCC naphtha, hydrocracker and hydrotreater naphthas, natural gas condensate, LPG condensate, gas well condensate or mixture thereof and the heavier hydrocarbon feedstocks includevacuum gas oil, vacuum slop, atmospheric gas oil, visbreaker/coker heavy gas oil, cycle oils, slurry oils, hydrocracker bottom, fuel oil, coker fuel oil, atmospheric residue, foots oil, vacuum residue or mixture thereof.

8. The process as claimed in claim 1, wherein a sum of yields of ethylene plus propylene is not less than 25 wt % and 15 wt % in the first and second reaction zones respectively.

9. The process as claimed in claim 1, wherein the propylene to ethylene ratio in the product from the second reaction zone is not less than 2.5:1.

10. The process as claimed in claim 1, wherein the regenerator can be a single stage or multistage to burn the entire coke laden spent catalyst to form regenerated catalyst with coke content not exceeding 0.09 wt % and thus meeting the heat requirement of the first and second reaction zones.

11. The process as claimed in claim 1, wherein the two reactors are operated in series with respect to catalyst flow and parallel with respect to feed flow.

12. The process as claimed in claim 1, wherein the catalyst employed comprises Y -zeolite in rare earth ultrastabilised form with bottom cracking components consisting of peptized alumina, acidic silica alumina or gamma alumina, pentasil shape selective zeolites or a mixture thereof which is capable of optimally cracking both the lighter and heavier hydrocarbon feeds.

13. The process as claimed in claim 1, wherein the catalyst employed is solid micro-spherical acidic materials with average particle size of 60-80 microns and apparent bulk density of 0.7-1.0 gm/cc.

14. The process as claimed in claim 1, wherein the active catalyst components are supported on relatively inactive materials such as silica/alumina or silica- alumina compounds, comprising kaolinites or with active matrix components comprising pseudobomite alumina.

15. The process as claimed in claim 1, wherein the lighter hydrocarbon feedstock and steam at saturated or superheated conditions are mixed in a zone prior to contact with the catalyst and uniformly distributed using any of the distributors like manifold type, concentric ring type, perforated plate type, into the first reaction zone and are uniformly contacted with hot catalyst from the common regenerator in the first reaction zone.

16. The process as claimed in claim 1, wherein the conversion in the second reaction zone, the sum of all products boiling less than or equal to 220° C. plus coke, is not less than 70 wt %.

17. The process as claimed in claim 1, wherein the excess heat generated in the catalyst regenerator due to processing of heavy feedstock in the second reaction zone is utilized effectively for cracking the lighter hydrocarbon feedstock at temperature in the range of 600° C. to 700° C. in the first reaction zone.

* * * * *